Figure 3:
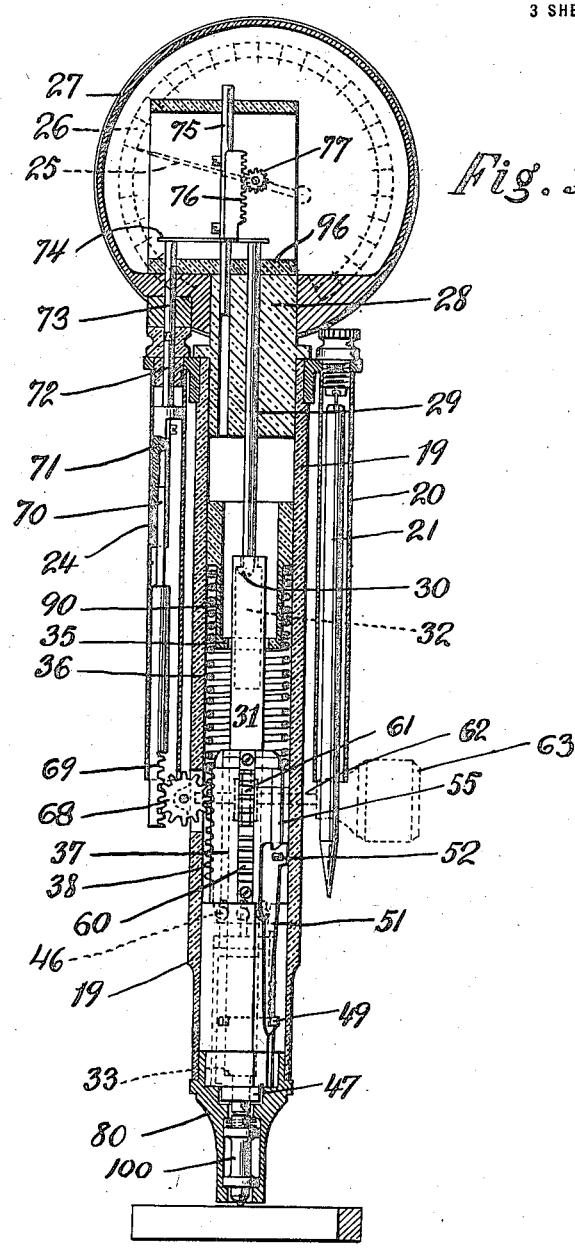

W. F. SHORE.
SCLEROSCOPE.
APPLICATION FILED MAY 27, 1914.
1,154,663.
Patented Sept. 28, 1915.
3 SHEETS—SHEET 1.
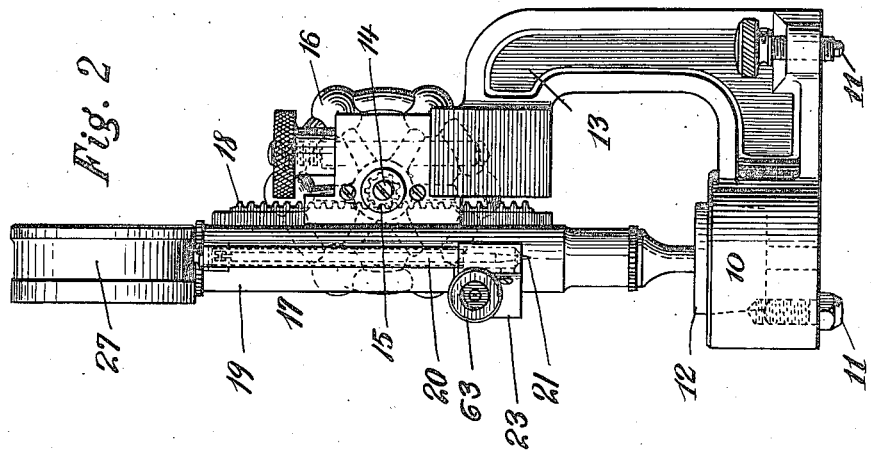
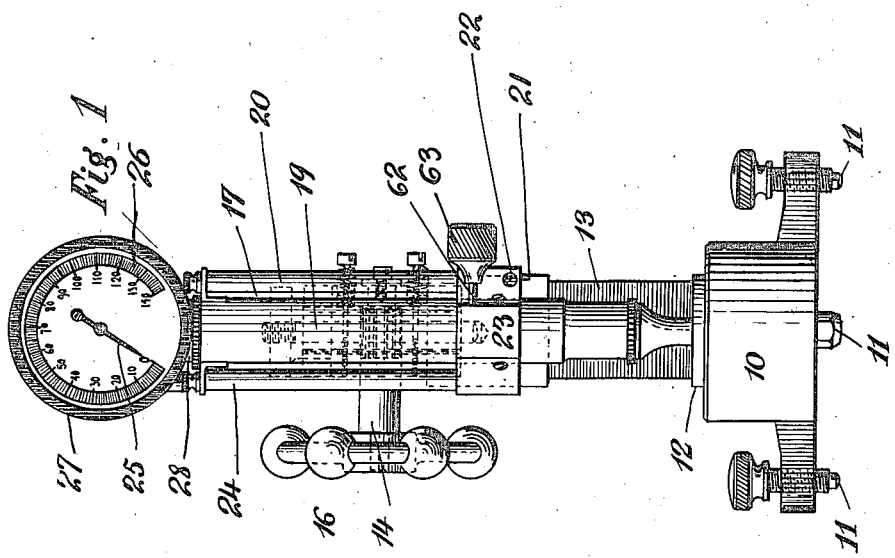
WITNESSES:
INVENTOR
William F. Shore
BY
His ATTORNEY

W. F. SHORE.
SCLEROSCOPE.
APPLICATION FILED MAY 27, 1914.

1,154,663.

Patented Sept. 28, 1915.
3 SHEETS—SHEET 2.

WITNESSES:

INVENTOR
William F. Shore
BY
ATTORNEY

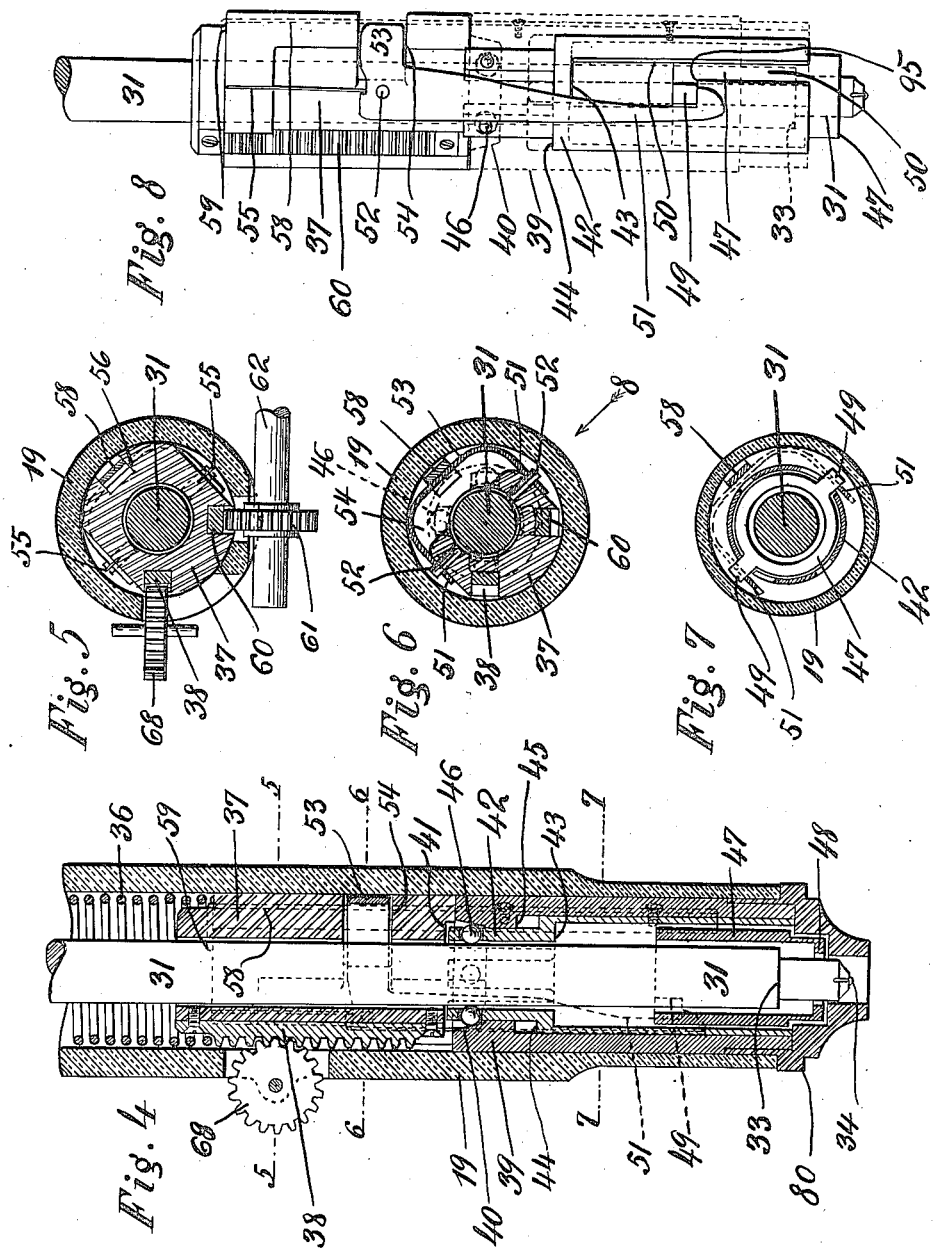

UNITED STATES PATENT OFFICE.

WILLIAM F. SHORE, OF NEW YORK, N. Y., ASSIGNOR TO THE SHORE INSTRUMENT & MANUFACTURING COMPANY, A CORPORATION OF NEW YORK.

SCLEROSCOPE.

1,154,663.      Specification of Letters Patent.     Patented Sept. 28, 1915.

Application filed May 27, 1914. Serial No. 841,342.

*To all whom it may concern:*

Be it known that I, WILLIAM F. SHORE, a citizen of the United States, residing at 237 West One Hundred and Forty-eighth street, New York, in the county of New York and State of New York, have invented certain new and useful Improvements in Scleroscopes, of which the following is a full, clear, and exact specification.

This invention relates to improvements in scleroscopes or instruments for testing the hardness of solid substances.

In United States Letters Patent No. 962,790, issued June 28, 1910, there is described and claimed a scleroscope, embodying a striker, means for raising and retaining the striker at a given height above the substance to be tested, and means for releasing the striker, which then falls by gravity upon the substance to be tested. The height of the rebound of the striker from the substance is readable upon a properly calibrated scale, and indicates accurately the hardness of the tested substance. As is obvious, however, the striker does not remain at the height of its rebound, but falls down upon the substance immediately after the rebound. Consequently, the operator has to read the height of the rebound instantly, at the moment the striker is at its highest point. This is difficult and can only be done by a trained operator, skilled in noting the position of the striker with relation to the scale at the instant the striker is in its highest position of the rebound from the substance to be tested.

The broad object of this invention is, therefore, to provide means for eliminating the above difficulty and whereby the height of the rebound, *i. e.*, the degree of hardness of the tested substance, is shown definitely by a pointer on a graduated dial, the pointer remaining at rest at a given degree until another test is to be made, thus permitting of accurate reading by unskilled operators.

Other objects of the invention are to improve in general the construction of the scleroscope with a view of obtaining an accurate scientific instrument, comprising a relatively few number of parts and adapted to be manufactured at a reasonable cost.

These and other ancillary objects of the invention will appear as this specification proceeds, while reference is had to the accompanying drawings, in which:

Figure 1 is a front view of a scleroscope embodying the invention. Fig. 2 is a side view. Fig. 3 is an enlarged sectional view, with parts omitted. Fig. 4 is an enlarged view of the lower portion of Fig. 3, showing the clutch mechanism for retaining the striker at its highest point of the rebound, together with other associated elements of the invention. Fig. 5 is a transverse sectional view, taken on line 5—5 of Fig. 4. Fig. 6 is a similar view on the line 6—6 of Fig. 4. Fig. 7 is another sectional view on line 7—7 of Fig. 4, and Fig. 8 is a detail view of certain parts of Fig. 4, looking in the direction of the arrow 8 in Fig. 6.

Referring to the general construction and appearance of the apparatus in Figs. 1 and 2, the reference numeral 10 indicates a base adapted to be leveled by screws 11. 12 is an anvil inserted in the base, and 13 is an upright for the support of a shaft 14, which carries a pinion 15 operated by a handwheel 16, for adjusting the position of the scleroscope 17 above the substance to be tested, which is placed upon the anvil, for which purpose the scleroscope is provided with a rack 18, which meshes with the pinion 15 aforesaid.

The scleroscope proper, comprises a cylindrical casing or tube 19, secured to the aforesaid rack 18. The casing 19 carries to the one side a protecting tube 20 for the plumb rod 21, the position of which may be observed through an aperture 22 in a block 23, secured to the casing 19, Fig. 1. To the other side of the casing 19, there is secured a tube 24 containing means to be described hereafter, for operating a pointer or indicator 25, which moves over a scale 26, within a housing 27, carried by a plug 28 at the top of the casing 19. Within said plug there is movably supported a rod 29, having a hook 30 at its lower end.

The striker 31, which is the main operating element of my invention, is in the form of a rod of superhard compressed steel, provided with a recess 32, forming an inner flange at the top, and having a shoulder 33 near the bottom.

34 is a diamond or other substance of like hardness inserted in the lower end of the striker, Fig. 4.

Surrounding the upper end of the striker (Fig. 3) there is a fixed bushing 90, forming a guide at 35. A spring 36 bears against a shoulder on the bushing and the lower end of the spring bears against a shoulder on the indicator-operating sleeve 37, to which is secured a rack 38. The spring 36 forces the sleeve 37 down against a fixed outer hollow clutch member 39, having an inner cone shaped surface 40. The sleeve 37 also has a shoulder 41 at its lower end, Fig. 4.

Interposed between the striker 31 and the outer clutch member is an inner movable clutch member in the form of a sleeve or cylinder 42, having the lower and upper annular shoulders 43 and 44, which latter are adapted to bear against the shoulder 45 in the outer clutch member 39. The inner clutch member carries balls 46 adapted to grip the striker 31.

47 is a pilot-sleeve having an annular flange 48 adapted to take against the shoulder 33 on the striker and provided with opposed lugs 49 which project outward through slots 50 in the movable clutch member 42. The lugs 49 are engaged or caught by hooks 51 pivoted on the dial-operating-sleeve 37 at 52 and joined by a yoke 53, which lies within a cutout 54 in the sleeve 37, as seen in Figs. 6 and 8. Springs 55 keep the hooks 51 in engagement with the lugs 49. Within a groove 56, Fig. 5, in the sleeve 37, lies a trip 58, secured by screws to the outer fixed clutch member 39. The trip has a finger 59, which projects inwardly over the hook yoke 53.

60 is a rack secured to the dial-operating sleeve 37 and which meshes with a pinion 61 on a shaft 62, operated by a knob 63, Fig. 1. The shaft 62 is supported in the block 23.

Referring to Fig. 3, the aforesaid rack 38, on the sleeve 37, meshes with a pinion 68 journaled in the casing 19, and which pinion 68 in turn operates a rack 69 within the sleeve or tube 24 aforesaid. Secured to the rack, there is a pin 70, which engages frictionally a sleeve 71, carrying a pin 72, adapted to strike a rod 73 secured to a cross-bar 74 to the other end of which the aforesaid rod 29 is fixed. The cross-bar 74 carries a guide-pin 75, which is provided with a rack 76 in mesh with a pinion 77 on the shaft of the indicator 25. 80 is a protecting cap for the lower end of the striker 31.

The operation is as follows: The substance to be tested is laid on the anvil 12 and the scleroscope adjusted in position upon the substance by means of the pinion 15 and rack 18, Fig. 2. The knob 63 is then turned by hand to rotate the shaft 62, which, through the pinion 61 and rack 60, causes the sleeve 37 to be raised to a given height, and compressing the spring 36. The pilot-sleeve 47 moves upward with the sleeve 37, being caught by the hooks 51 and the flange 48 on the pilot-sleeve, engages the shoulder 33 on the striker 31, moving the latter upward also and disengaging its flange 32 from the hook 30. On the upward movement, and before the yoke 53 of the hooks 51, reaches the trip finger 59, the pilot-sleeve 47 engages the lower shoulder 43 of the movable clutch member 42 lifting it and therewith the balls 46 out of clutching position within the case 40. The upward movement continues until the yoke 53 strikes the trip-finger 59 when the hooks 51 swing on their pivots 52 and release the pilot-sleeve 47. The latter and the striker now fall together. The pilot-sleeve in its fall pulls down the clutch-sleeve 42 and the balls 46, because the pilot-sleeve lugs 49 strike the lower edge 95 of the cut-out 50 of the clutch sleeve, Fig. 8, but as the clutch is only a one-way clutch the downward pull of the clutch leaves the striker free to rebound. The moment, however, that the striker by gravitation again begins to fall, its second downward movement is instantly arrested by the balls settling between the striker and the cone surface 40. The lifting of the sleeve 37 causes a rotation of the pinion 68 in an anti-clockwise direction, and it in turn pulls down the rack 69, pin 70, friction-sleeve 71, and pin 72, and the cross-head 74 drops down upon the bracket 96, Fig. 3, thus returning the pointer 25 to zero. Thereafter, the knob 63 is returned by the operator, and the sleeve 37 is then forced down by the spring 36, whereby the pinion 68 is rotated in the opposite clockwise direction, lifting the rack 69 and pin 70, which carries the sleeve 71 upward, and through the instrumentality of the pin 72 striking the rod 73, the cross-head 74 is lifted until the hook 30 engages the flange 33 in the striker. The weight of the latter prevents further lifting of the cross-head 74, but the upward movement of the latter has been indicated by the pointer 25, as is obvious. Further upward movement of the rack 69 causes the pin 70 to slide within the friction sleeve 71.

To sum up. The striker is lifted a certain height, then released, and then it falls. On its rebound, it is caught and held at a height, depending upon the rebound i. e., the hardness of the tested substance, and which height is different for each degree of hardness of the substance. The following rotation of the pinion 68, caused by the spring 36, results in an upward movement of the pin 75 and corresponding movement of the pointer which continues until the hook 30 engages the striker, when the indicator stops, thus registering definitely and remaining at rest until another test is to be made of the hardness of the substance.

Fig. 3 shows a modified form of striker, in that a supplemental hammer 100 is used, which transmits the blow from the striker to the substance to be tested.

It will be seen from the foregoing that the rebound of the striker is permanently indicated upon the scale until another test is to be made, consequently, the apparatus can be operated by unskilled operatives and an accurate record of the tests may be obtained.

The details of the construction, as set forth, may be varied within the principle of the invention, and the scope of the appended claims.

I claim:

1. An apparatus for testing the hardness of a solid body, comprising in combination a striker, means for lifting the same, means for releasing said striker from its lifting means, permitting said striker to impinge and rebound from the said solid body, means for arresting the striker when it has reached its greatest height by reason of the rebound and mechanical means in said apparatus for permanently registering the rebound of the striker.

2. An apparatus for testing the hardness of a solid body, comprising in combination a striker, means for lifting the same, means for automatically releasing said striker from its lifting means, permitting said striker to impinge and rebound from the said solid body, means for arresting the striker when it has reached its greatest height by reason of the rebound and mechanical means in said apparatus for registering the rebound of the striker.

3. An apparatus for testing the hardness of a solid body, comprising in combination a striker, means for lifting the same, means for automatically releasing said striker from its lifting means, permitting said striker to impinge and rebound from the said solid body, means for arresting the striker when it has reached its greatest height by reason of the rebound and mechanical means for permanently registering the rebound of the striker in said apparatus.

4. An apparatus for testing the hardness of a solid body, comprising in combination a striker, means for lifting the latter a given distance, means for releasing the striker from its lifting means when said striker has reached its highest position, permitting the striker to impinge and rebound from said body, and means for arresting the striker when it has reached its greatest height by reason of the rebound.

5. An apparatus for testing the hardness of a solid body, comprising in combination a striker, means for lifting the latter a given distance, means for releasing the striker from its lifting means when said striker has reached its highest position, permitting the striker to impinge and rebound from said body, a clutch mechanism, and a plurality of balls in said clutch mechanism for arresting the striker when it has reached its greatest height by reason of the rebound.

6. An apparatus for testing the hardness of a solid body, comprising in combination a striker, means for lifting the latter a given distance, means for releasing the striker from its lifting means when said striker has reached its highest position, permitting the striker to impinge and rebound from said body, a clutch mechanism, and a plurality of balls in said clutch mechanism for arresting the striker to prevent the latter from again impinging said solid body.

7. An apparatus for testing the hardness of a solid body, comprising in combination a striker, means for lifting the latter a given distance, means for automatically releasing the striker from its lifting means when said striker has reached its highest position, permitting the striker to impinge and rebound from said body, and means for automatically arresting the striker when it has reached its greatest height by reason of the rebound.

8. An apparatus for testing the hardness of a solid body, comprising in combination a striker, means for lifting the latter a given distance, means for releasing the striker from its lifting means when said striker has reached its highest position, permitting the striker to impinge and rebound from said body, and an automatic clutch for arresting the striker when it has reached its greatest height by reason of the rebound.

9. An apparatus for testing the hardness of a solid body, comprising in combination a striker, means for lifting the latter a given distance, means for releasing the striker from its lifting means when said striker has reached its highest position, permitting the striker to impinge and rebound from said body, and an automatic clutch comprising an outer relatively fixed clutch member, an inner movable clutch member, and clutch balls operated by the latter for arresting the striker when it has reached its greatest height by reason of the rebound.

10. An apparatus for testing the hardness of a solid body, comprising in combination of a striker, means for lifting said striker, automatic means for releasing said striker from its lifting means, permitting said striker to impinge and rebound from said solid body, means for arresting said striker at the end of its rebounding movement, an indicator means for automatically operating said indicator to indicate the height of the rebound, and means for operating said lifting means.

11. An apparatus for testing the hardness of a solid body, comprising in combination of a striker, a pilot-sleeve for raising the latter, means for releasing said pilot-sleeve from said striker, permitting the latter to impinge and rebound from said solid body, and a clutch mechanism operated by the said pilot-sleeve for preventing said striker from impinging said body more than once.

12. An apparatus for testing the hardness of a solid body, comprising in combination of a striker, a pilot-sleeve for raising the latter, automatic means for releasing said pilot-sleeve from said striker, permitting the latter to impinge and rebound from said solid body, and a clutch mechanism operated automatically by the said pilot-sleeve for preventing said striker from impinging said body more than once.

In testimony whereof, I affix my signature, in presence of two witnesses.

WILLIAM F. SHORE.

Witnesses:
    CHAS. J. MACELWEE,
    I. C. DRAKE.